3,031,842
THRUST CONTROL FOR SOLID ROCKET
Walter A. Ledwith, Glastonbury, Conn., assignor to United Aircraft Corporation, East Hartford, Conn., a corporation of Delaware
Filed May 18, 1959, Ser. No. 813,805
9 Claims. (Cl. 60—35.6)

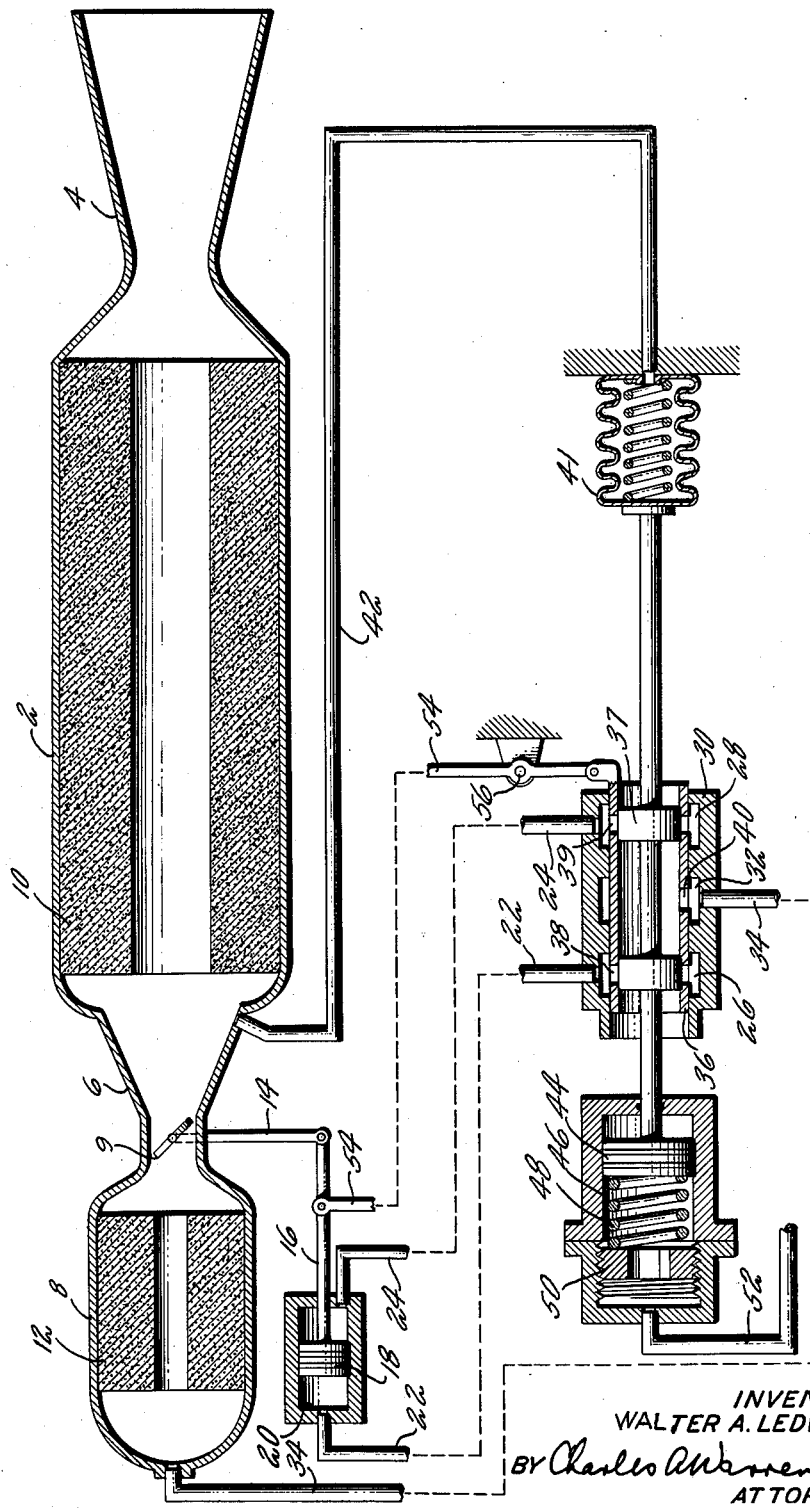

This invention relates to a solid fuel rocket.

One feature of the invention is an arrangement for controlling the rate of combustion of the solid propellant in the combustion chamber. Another feature is the controlling of the pressure in the combustion chamber thereby to control the rate of combustion. Another feature is the control of the pressure in the main combustion chamber by varying the rate of combustion in an auxiliary chamber which discharges into the main chamber.

One feature is an auxiliary combustion chamber having a cold grain propellant for burning at a relatively low temperature with an arrangement for controlling its burning rate and thus the rate of discharge of its combustion products into the main combustion chamber.

Other features and advantages will be apparent from the specification and claims, and from the accompanying drawings which illustrate an embodiment of the invention.

The single FIGURE is a longitudinal sectional view through the rocket with the control mechanism shown diagrammatically.

The rocket is in the form of a main combustion chamber 2 having a nozzle 4 at one end and having an inlet 6 at the other end communicating with an auxiliary combustion chamber 8. A valve 9 controls the rate of flow from the auxiliary chamber 8 to the main combustion chamber 2.

The main chamber 2 is filled with a solid fuel 10 and the auxiliary chamber has a solid fuel 12 therein. The solid fuel 12 is a "cold grain" fuel the combustion of which produces gas at a lower temperature than that of the "primary" grain of the fuel 10 in the main chamber. The lower temperature of the "cold grain" gas is such that it is possible to use a throttle valve 9.

It is well known that the rate of combustion in a solid fuel rocket varies with the pressure in the chamber so that if the pressure increases the rate of burning also increases. The present invention incorporates an arrangement for controlling the pressure within the main combustion chamber 2 in order to have the combustion take place at the desired rate. To accomplish this the valve 9 has an actuating arm 14 connected to a rod 16 on a piston 18 in a cylinder 20. The opposite ends of the cylinder 20 are connected by ducts 22 and 24 to grooves 26 and 28, respectively, in a valve casing 30. This casing has a centrally located groove 32 supplied by fluid under pressure from the auxiliary chamber 8 by a conduit 34.

A valve sleeve 36 positioned within the casing 30 surrounds the valve 37 and has ports 38 and 39 in alignment with the grooves 26 and 28 and a centrally located port 40 communicating with the groove 32. The valve 37 is connected to a pressure sensing bellows 41, the bellows being connected by a duct 42 to the main chamber 2 so that the bellows is moved in response to variations in pressure in the main chamber. The valve 37 carries a plunger 44 in a cylinder 46 and this plunger is urged to the right by a spring 48. The spring abuts a ring 50 in the cylinder. The ring is threaded and may be adjusted axially of the cylinder to vary the effective pressure of the spring 48 on the plunger 44. The end of the cylinder 46 may be connected as by a duct 52 to an external pressure source which may be utilized for adjusting the position of the valve 38 with respect to the surrounding sleeve 36.

The sleeve 36 is connected by a link 54 to the rod 16 on the piston 18 and this link is mounted to pivot on a pin 56. Thus the valve 37 with the surrounding sleeve and the piston 18 and cylinder 20 constitute a servo mechanism with a position control means such that a small movement of the valve 37 axially will obtain a predetermined and corresponding movement of the piston 18 and therefore of the valve 9.

When the rocket is in operation the bellows 41 senses the pressure in the main chamber. If this pressure goes up the valve 37 is moved to the left thereby causing fluid under pressure through the duct 34 to enter the left-hand end of the cylinder 20 thereby moving the valve 9 in an opening direction. With the valve 9 more open the combustion products from the auxiliary chamber 8 move readily past the valve 9 thereby reducing the pressure in the auxiliary chamber to slow the rate of combustion therein. This reduced combustion rate will result in less gas flow from the auxiliary chamber to the main chamber. The final result is to restore the desired pressure in the main chamber.

Conversely, if the main chamber pressure decreases, valve 37 is moved to the right and thereby causing movement of valve 9 in a closing direction. This will increase the pressure in chamber 8, increasing the rate of combustion. The increased gas flow into the main chamber will restore the selected gas pressure therein.

It is to be understood that the invention is not limited to the specific embodiment herein illustrated and described, but may be used in other ways without departure from its spirit as defined by the following claims.

I claim:

1. A solid propellant rocket, including a main combustion chamber having solid propellant therein, an auxiliary combustion chamber having a fluid connection with the main chamber, the fluid connection constituting a main discharge passage from said auxiliary chamber and a propellant in said auxiliary chamber for producing, upon burning, gas at an elevated pressure, in combination with a valve in the fluid connection for varying the rate of discharge from said auxiliary chamber into said main chamber, said valve being actuated by means responsive to pressure in the main chamber.

2. A solid propellant rocket, including a main combustion chamber having a solid propellant therein, a thrust nozzle connected to said chamber and through which products of combustion from said chamber are discharged, and an auxiliary combustion chamber having a fluid connection with the main chamber, said auxiliary chamber having a solid propellant therein, in combination with a valve for controlling the discharge from said auxiliary chamber, and means responsive to pressure in said main chamber for actuating said valve.

3. A rocket as in claim 2 in which said valve is in said fluid connection and in which the pressure responsive means moves the valve in an opening direction in response to increasing pressure in the main chamber.

4. A solid propellant rocket, including a main combustion chamber having solid propellant therein, an auxiliary combustion chamber having a fluid connection with the main chamber and a propellant in said auxiliary chamber for producing, upon burning, gas at an elevated pressure, in combination with a valve in the fluid connection for varying the rate of discharge from said auxiliary chamber into said main chamber, said valve being moved in a closing direction by means responsive to a decrease in pressure in the main chamber.

5. A solid propellant rocket, including a main combustion chamber having solid propellant therein, an auxiliary combustion chamber having a fluid connection with the main chamber and a propellant in said auxiliary chamber for producing, upon burning, gas at an elevated pressure, in combination with a valve in the fluid connection for varying the rate of discharge from said auxiliary chamber into said main chamber, the propellant in the auxiliary chamber burning at a substantially lower temperature than the propellant in the main chamber.

6. A solid propellant rocket, including a main combustion chamber having solid propellant therein, an auxiliary combustion chamber having a fluid connection with the main chamber and a propellant in said auxiliary chamber for producing, upon burning, gas at an elevated pressure, in combination with a valve in the fluid connection for varying the rate of discharge from said auxiliary chamber into said main chamber, said valve being moved by means responsive to pressure variations in the main chamber for increasing the rate of combustion in the auxiliary chamber in response to a decrease in the main combustion chamber pressure.

7. A solid propellant rocket, including a main combustion chamber having solid propellant therein, an auxiliary combustion chamber having a fluid connection with the main chamber and a propellant in said auxiliary chamber for producing, upon burning, gas at an elevated pressure, in combination with a valve in the fluid connection for varying the rate of discharge from said auxiliary chamber into said main chamber, said valve being moved by means responsive to pressure variations in the main chamber for increasing the rate of combustion in the auxiliary chamber in response to a decrease in the main combustion chamber pressure and means for adjusting the effective pressure in the main chamber.

8. A solid propellant rocket, including a main combustion chamber having solid propellant therein, an auxiliary combustion chamber having a fluid connection with the main chamber and a propellant in said auxiliary chamber for producing, upon burning, gas at an elevated pressure, in combination with a valve in the fluid connection for varying the rate of discharge from said auxiliary chamber into said main chamber, said valve being movable by a fluid pressure system including a control valve and means for adjusting the effective position of a control valve in response to movement of the first mentioned valve.

9. An apparatus for the emission of gas at a sustained elevated pressure by burning gas-affording materials at a rate determined by the properties of said materials, said apparatus comprising a main combustion chamber wherein gas is producible at an elevated pressure subject to deviation, and a gas discharge conduit means for passage of gas from said chamber, a control combustion chamber wherein gas is producible at an elevated pressure, and control conduit means between said chambers for exit of gas from said control chamber into said main chamber, a valve means positioned in said control conduit means for controlling the flow of gas through said control conduit means, said valve means having a positioning means, and a control means responsive to a deviation in pressure in said main combustion chamber and adapted for the activation of said positioning means to adjust said valve means to the setting required to overcome said deviation.

References Cited in the file of this patent

UNITED STATES PATENTS

| | | |
|---|---|---|
| 2,408,111 | Truax et al. | Sept. 24, 1946 |
| 2,555,333 | Grand et al. | June 5, 1951 |
| 2,683,963 | Chandler | July 20, 1954 |
| 2,791,883 | Moore et al. | May 14, 1957 |

FOREIGN PATENTS

| | | |
|---|---|---|
| 719,946 | Great Britain | Dec. 8, 1954 |